April 8, 1941.  H. A. FABER  2,237,482
GAS WASHER
Original Filed Oct. 8, 1936
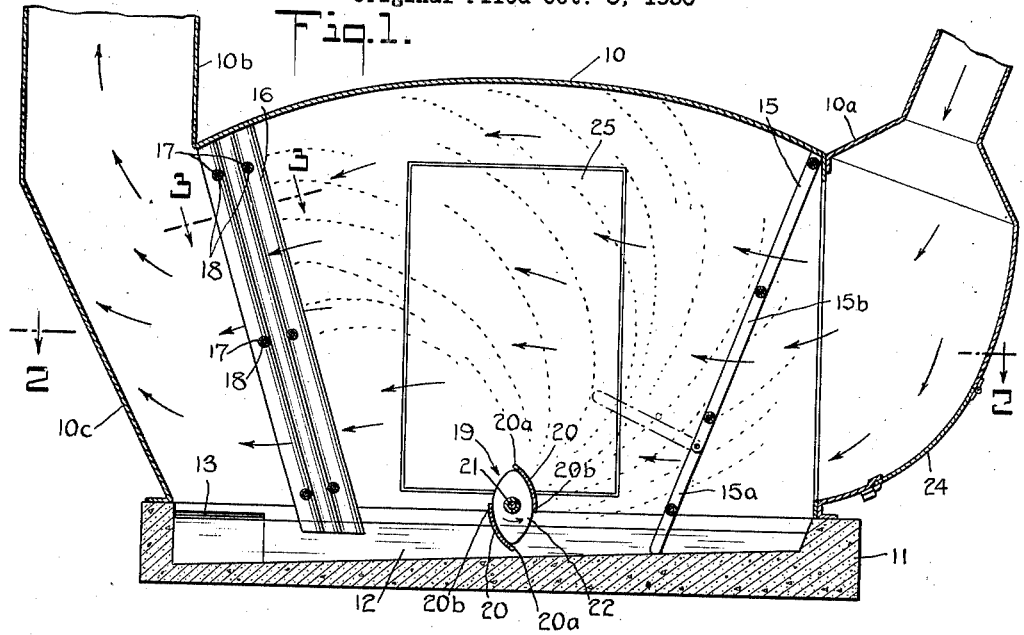
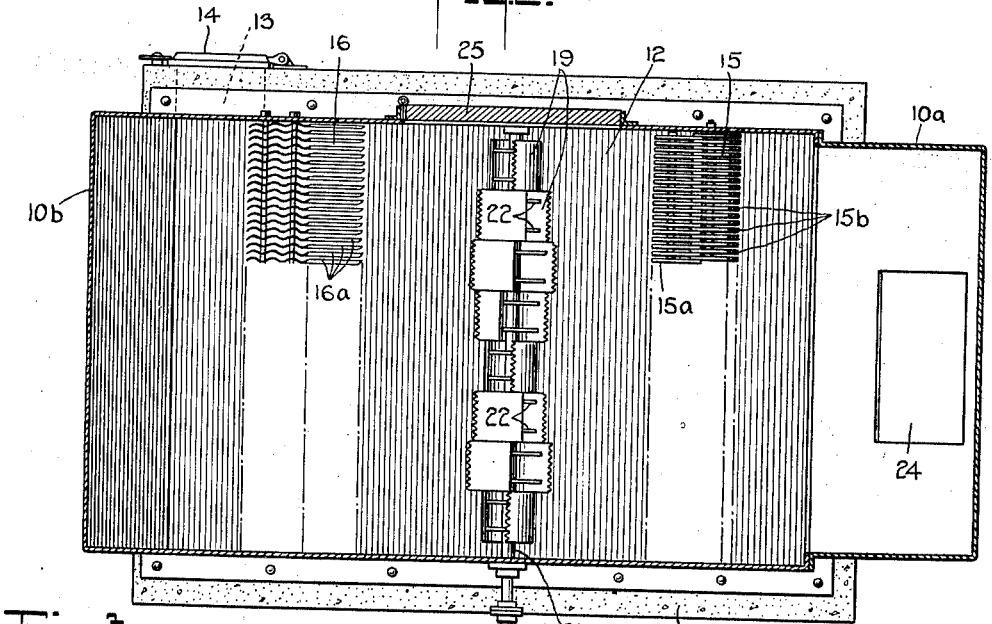
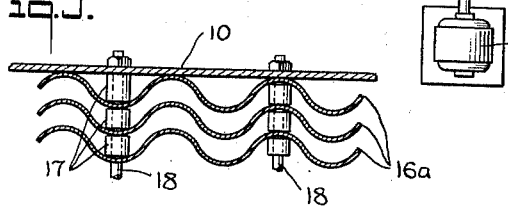
INVENTOR
Herbert A. Faber
BY
HIS ATTORNEY Patented Apr. 8, 1941

2,237,482

UNITED STATES PATENT OFFICE 2,237,482

GAS WASHER

Herbert A. Faber, Cincinnati, Ohio

Continuation of application Serial No. 104,582, October 8, 1936. This application December 28, 1939, Serial No. 311,228

4 Claims. (Cl. 183—21)

This invention relates generally to air and other fluid treating apparatus, but has particular reference to apparatus for removing particles of dust from dust-laden air and to apparatus for removing extraneous moisture from air and other gases.

This application constitutes a continuation of my co-pending allowed application Serial No. 104,582, filed October 8, 1936, and entitled Gas washer.

The efficient cleansing of air from industrial establishments where considerable quantities of dust are raised by the nature of the activities of the establishments, presents a problem which has led to the development of numerous devices and methods for collection. Embodiments of the present invention are designed to accomplish highly satisfactory results in this field with a minimum of original cost and subsequent maintenance cost.

A primary object of the invention, then, is to provide means whereby air, heavily laden with dust, may be very efficiently cleansed.

According to the invention, provision is made for continuously spraying liquid, preferably water, within the confines of a relatively large chamber; for conducting the dust laden air into and through the chamber; and for relieving the wetted air of both the particles of dust and particles of moisture carried thereby. The latter is accomplished by filter means which may be of any suitable character, but which preferably comprises a plurality of relatively thin walls closely spaced apart in side-by-side relationship across the width of the chamber between the chamber proper and the air outlet, and substantially aligned therewith edgewise, forming a series of narrow, vertically elongated and horizontally open, and preferably tortuous, passages for air flow. The walls of the passages provide considerable surface area, and are so formed as to allow downflow of collected moisture.

A main object of the invention is provision for the continual washing of the passages and the walls thereof free from foreign matter.

The passages and walls thereof have substantial length along the horizontal, and, accordingly, even though placed within the direct line of the liquid spray, have portions relatively remote from the force and the washing action thereof.

An important feature of this invention resides in the slanting of the walls of the passages at an appreciable angle to the vertical, lengthwise of the chamber, so that the bottoms thereof are considerably closer to the center of the chamber than are the tops. Thus, droplets of liquid spray collect into streams and flow substantially vertically downward traversing the passages diagonally of the lengths of the walls thereof, and discharging along those wall edges which are most remote from the center of the chamber. It should be noted that the streams of sprayed liquid thus traverse substantially the entire facial areas of the walls which define the passages.

An optional feature resides in the provision of moisture collecting plate means spaced apart horizontally from and extending transversely of the outlet openings of the above described series of closely spaced, tortuous gas flow passages, such means providing an inclined surface which slopes downwardly toward the gas flow passages for the collection and the forming into a stream, on the sloping surface thereof, of particles of moisture not entrained by the series of passages.

The moisture collecting means is advantageously provided by an end wall of the chamber, and directs the cleansed air upwardly through the outlet opening.

An optional feature resides in the provision of a grating across the inlet opening of the chamber and preferably directly within the path of the liquid spray, for the preliminary filtering of dust-laden air entering the chamber. The grating is preferably also appreciably inclined to the vertical, and forms upwardly and downwardly extending, horizontally open, vertically elongated, closely spaced, narrow passages.

In preferred embodiments there are combined, with the above described chamber and air filter passages, a maintained body of liquid, at the bottom of the chamber, and one or more rotor-spray units for disseminating quantities of maintained body of liquid throughout the confines of the chamber.

The rotor spray units are preferably constructed according to the disclosure of my U. S. Patent No. 2,182,471, dated December 5, 1939, entitled Rotor unit for spraying liquids.

While the invention is herein particularly illustrated and described with respect to a preferred embodiment adapted for the removal of dust from dust-laden air, it should be realized that other embodiments constructed pursuant to the principles here disclosed and claimed, may be utilized for variously treating air or other gases, as in washing gases generally, humidifying air, etc.

Further objects and features of the invention will be apparent from the following detailed description and the accompanying drawing.

In the drawing:

Fig. 1 represents a vertical section taken centrally through a preferred embodiment of the apparatus.

Fig. 2 represents a horizontal section taken on the line 2—2 of Fig. 1.

Fig. 3 represents a horizontal section taken on line 3—3 of Fig. 1.

The illustrated and hereinafter particularly described apparatus represents a preferred form of the invention, and embodies all of the inventive features thereof.

The numeral 10 indicates a housing enclosing a relatively large three-dimensional washing chamber, the housing resting upon a base 11. The housing may be constructed of sheet metal, and the base of concrete. A recess formation in the base 11 provides for the maintenance of a body of liquid 12, whose surface opens into the interior of the housing 10. For clean-out purposes, the recess slopes downwardly from one end of the structure to the other, see Fig. 1. A clean-out opening 13, provided with a water-tight door 14, may be conveniently located at the depressed end of the recess.

A conduit 10a leading from a suitable source of supply of the gas to be processed, extends approximately vertically downward to open into the housing proper over substantially the entire area of an end of same. The lower wall of the conduit 10a is desirably curved as illustrated in Fig. 1 to receive the larger particles of extraneous matter from the entering gas and direct such particles into the body of liquid 12. A conduit 10b, opening into the end of the housing opposite to that end at which the conduit 10a opens, serves to remove the processed gas from the housing. The two conduits for supplying and discharging gas, respectively, are spaced apart from each other by substantially the length of the washing chamber.

Filter means, such as the grating 15, embodying a series of closely spaced up and down passages for preliminarily filtering the gas as it enters the housing proper, may be so disposed with respect to the opening of conduit 10a that all of the gas entering therefrom must pass in intimate contact with the filtering surfaces. The up and down passages of grating 15 are formed by closely spaced longitudinal strip members 15a. For best results, and for a purpose to be hereinafter made clear, the grating 15 is disposed at an appreciable angle to the vertical sloping toward the opening of the inlet conduit. It is advantageous that the lower portion 15a of the grating 15 extend to the bottom of the recess in the base to prevent entrance into the washing chamber of large objects, and that it be hinged to the upper portion 15b for affording, during the clean-out operation, an unobstructed passage into the interior of the housing proper.

A fine spray of liquid is disseminated throughout substantially the entire voluminal extent of the chamber by means described in detail hereinafter. The spray, by its direct action, serves to keep filtering surfaces of the apparatus continually moistened, and flushed free of collected foreign matter, and wets air, and portions of foreign matter, such as dust, carried thereby, as it passes through the chamber.

For removing the wetted particles of foreign matter from air passing from the chamber, as well as particles of moisture carried thereby, filter means, providing a series of narrow, vertically long and horizontally open, closely spaced, preferably tortuous, passages, is disposed across the outlet from the chamber.

The filter means desirably comprises a set of closely spaced corrugated baffles 16a having considerable surface area. They are preferably formed from sheet metal, corrugated lengthwise or otherwise, to provide a plurality of downwardly directed channel formations.

The individual baffle plates 16a may be spaced and held in position rigidly relative to one another as illustrated in detail in Fig. 3. The individual baffle plates, together with spacer blocks 17, are strung on tie rods 18; the latter are secured in bolt fashion to the housing 10. The set of baffles 16 is disposed at an appreciable angle to the vertical, sloping toward the opening into conduit 10b. The slope is advantageously such that the bottoms thereof lie closer to the center of the chamber than do the tops thereof, but the important consideration is that the slope be such that streams of liquid flowing substantially vertically downwardly therebetween, under the influence of gravity, will traverse substantially the entire facial areas of the baffle plates.

A portion of the body of liquid 12 is constantly disseminated in the form of a fine spray throughout substantially the entire voluminal extent of the housing 10, and in such manner as to impinge against the grating 15. The spray is preferably directed forcibly against both the grating 15 and the set of baffles 16 for effective washing thereof, although the air currents may serve to carry sufficient droplets to accomplish the desired washing action. This is most effectively accomplished by means of one or more rotor units, designed and constructed according to the disclosure of my previously referred to United States patent.

One embodiment of the rotor unit of the stated preferred type is indicated at 19. It comprises a pair of scoop members 20 rigidly mounted, in approximately the formation of diagonally opposite quarter-segments of an ellipse, on a shaft 21 for rotation therewith. The scoop members 20 are properly disposed on the shaft 21 by means of transverse supporting plates 22 desirably of elliptical form. The scoop members 20 each include a leading edge 20a and a trailing edge 20b, the surface therebetween having an arcuate contour as described and being wholly spaced apart from the axis of rotation. The shaft 21 is so disposed, horizontally, adjacent the body of liquid 12 that the leading edge 20a of each scoop member dips below the surface of the liquid and scoops a quantity of liquid therefrom at each revolution of the rotor.

As the particular scoop member concerned rises from the body of liquid, the quantity of liquid scooped out travels downwardly, under the influence of gravity, along the curved inner surface of the scoop member. Before it reaches the trailing edge 20b, it experiences a reversal of direction of travel by reason of the effect of centrifugal force. It then travels upwardly along the curved inner surface of the scoop member 20, and is forcibly discharged over the leading edge 20a substantially radially of the axis of rotation. The leading edge 20a is desirably serrated in sawtooth formation, and effects fine dissemination of the quantity of liquid in the form of a spray.

The differential between the centrifugal force and the effect of inertia acting upon the quantity of liquid to effect the stated reversal of direction of travel thereof is determined by the difference between the distance of the leading edge 20a from the shaft 21 and the distance of the trailing edge 20b from the shaft 21. These two distances may be varied in individual cases for satisfying particular demands of spray characteristics, such as degree of fineness, location of discharge, etc.

As illustrated in Fig. 2, a plurality of the rotor units 19 may be aligned side by side on the shaft 21, with scoop members disposed sequentially from end to end of the shaft, for obtaining time continuity of spray. The shaft 21 may be driven by any suitable means, as for instance, the electric motor 23.

Operation of the apparatus is as follows: the electric motor 23 drives the shaft 21 to effect dissemination of fine liquid spray, indicated by dotted lines, Fig. 1, throughout the washing chamber. The filtering means, namely grating 15 and the set 16 of baffles, have their filtering surfaces continuously moistened by the spray. Unprocessed gas, as for instance air laden with dust from certain types of factory operations, is supplied to the apparatus through the conduit 10a by suitable forced circulation. Large particles of extraneous matter will be dropped by the gas on the curved bottom of the conduit, and will tend to slide downwardly into the body of liquid 12. The gas passes through grating 15 into the interior of the housing 10, receiving a preliminary filtering in its passage. Certain extraneous matter will be deflected by the grating and will drop into the body of liquid 12. The moistened filtering surfaces of the grating elements 15a will collect smaller particles of foreign matter. Because of the slope, in preferred constructions, of the grating 15, the moisture, as it accumulates on the surfaces of the grating elements, will run in streams, washing the collected foreign particles down into the body of liquid. Accordingly, there will be no accumulation of foreign particles to clog air passages through the grating.

The partially cleansed air passes into the interior proper of the housing 10 and mixes with and is thoroughly scrubbed and washed by the fine spray of cleansing liquid. Any solid particles are thoroughly wetted. It should be noted, that the air, as it travels toward the filter means 16, carries along the particles of liquid spray.

As the washed gas passes through the irregular passages defined by moistened filtering surfaces of the baffle plates 16a, the wetted solid particles and droplets of moisture are collected by the surfaces, and, because of the particular type of slope of the latter, form streams that flow downwardly under the influence of gravity, and transverse substantially the entire facial areas of the baffle plates before discharging along the outside edges thereof into the body of liquid.

The completely processed gas is discharged through conduit 10b. Small droplets of moisture still retained by the gas, adhere to the sloping upper surface of moisture collecting end wall 10c, and flow back into the body of liquid 12. In this connection, it is noted that the surface 10c may be provided in any convenient manner, as for instance, by a separate plate.

Solid matter collected in the conduit 10a and by the grating 15 accumulates against the lower portion 15a of the grating. Wastes deposited from the interior proper of the housing and from the set of baffles settle to the bottom of the body of liquid and tend to collect near the clean-out door 13.

To permit cleansing of the entire interior of the apparatus a door 24 may be provided in conduit 10a, and a water-tight door 25 may be provided in either side of the housing 10. When it becomes desirable to flush out accumulated wastes the lower portion 15a of the grating 15 may be raised as indicated in dotted lines in Fig. 1, the door 22 opened, and the stream from a hose directed through the opening for flushing the wastes toward the clean-out door 13. The stream may be directed through door-opening 25 against the interior walls of the housing 10 and against the surfaces between baffle plates for further flushing of accumulated waste. The waste is conveniently removed through clean-out door 13.

Whereas I have described my invention by reference to a specific form thereof, it will be understood that many changes may be made without departing from the generic spirit of the invention as set forth herein and in the claims that follow.

I claim:

1. Apparatus of the class described, including a chamber, means for spraying liquid within said chamber, an outlet from said chamber disposed adjacent an end thereof, a plurality of relatively thin walls closely spaced apart side-by-side between the chamber proper and said outlet and substantially aligned therewith edgewise in the path of travel of liquid spray, said walls being provided with coordinating, upwardly and downwardly extending, corrugated formations, and forming baffles which substantially completely separate said chamber proper from said outlet, said walls sloping from adjacent the bottom of the chamber to a location at the top thereof which is considerably farther removed from the center of said chamber proper than is the bottom location thereof, and said walls being such that sprayed liquid flowing downwardly through the narrow passages defined thereby will traverse substantially the entire facial areas of said walls.

2. Apparatus of the class described, including a chamber, means for spraying liquid within said chamber, an outlet from said chamber disposed adjacent an end thereof, a plurality of relatively thin walls closely spaced apart side-by-side between the chamber proper and said outlet and substantially aligned therewith edgewise in the path of travel of liquid spray, said walls being provided with coordinating, upwardly and downwardly extending, corrugated formations, and forming baffles which substantially completely separate said chamber proper from said outlet, said walls sloping from adjacent the bottom of the chamber to a location at the top thereof which is considerably farther removed from the center of said chamber proper than is the bottom location thereof, and said walls being such that sprayed liquid flowing downwardly through the narrow passages defined thereby will traverse substantially the entire facial areas of said walls, and a moisture collecting surface spaced apart horizontally from the outlet openings of said side-by-side narrow passages defined by said walls, said moisture collecting surface being substantially coextensive with said outlet openings of the side-by-side narrow passages and sloping downwardly theretoward.

3. Apparatus of the class described, including a chamber, means for spraying liquid within said chamber, an outlet from said chamber disposed adjacent an end thereof, a plurality of relatively thin walls closely spaced apart side-by-side between the chamber proper and said outlet in the path of travel of liquid spray, said walls being so constructed and arranged as to function as baffles in forming a plurality of narrow indirect passages disposed side-by-side between the chamber proper and said outlet, and providing substantially the sole passage means from said chamber proper to said outlet, said walls sloping from adjacent the bottom of the chamber to a location at the top thereof which is considerably farther removed from the center of said chamber proper than is the bottom location thereof, and said walls being such that sprayed liquid flowing downwardly through the side-by-side narrow passages defined thereby will traverse substantially the entire facial areas of said walls.

4. Apparatus of the class described, including a chamber, means for spraying liquid within said chamber, an outlet from said chamber disposed adjacent an end thereof, a plurality of relatively thin walls closely spaced apart side-by-side between the chamber proper and said outlet and in the path of travel of liquid spray, said walls being so constructed and arranged as to function as baffles in forming a plurality of narrow indirect passages disposed side-by-side between the chamber proper and said outlet, and providing substantially the sole passage means from said chamber proper to said outlet, said walls sloping from adjacent the bottom of the chamber to a location at the top thereof which is considerably farther removed from the center of said chamber proper than is the bottom location thereof, said walls being such that sprayed liquid flowing downwardly through the side-by-side narrow passages defined thereby will traverse substantially the entire facial areas of said walls, and a moisture collecting surface spaced apart horizontally from the outlet openings of said side-by-side narrow passages defined by said walls, said moisture collecting surface being substantially coextensive with said outlet openings of the side-by-side narrow passages and sloping downwardly thereto-ward.

HERBERT A. FABER.